United States Patent
Nagai et al.

(10) Patent No.: US 6,426,887 B2
(45) Date of Patent: Jul. 30, 2002

(54) POWER CONTROL DEVICE, REMOTE CONTROL RECEIVING DEVICE AND OPTICAL COMMUNICATION DEVICE WITH ZERO POWER CONSUMPTION DURING STANDBY

(75) Inventors: Tomoyuki Nagai, Tenri; Shigeki Imai, Nara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/898,013

(22) Filed: Jul. 5, 2001

(30) Foreign Application Priority Data

Jul. 5, 2000 (JP) ........................................ 2000-203874

(51) Int. Cl.[7] .............................................. H04B 10/00
(52) U.S. Cl. ......................................... 363/78; 359/142
(58) Field of Search .................................. 359/142, 147, 359/152; 363/79, 78; 348/730; 713/323, 324, 330

(56) References Cited

U.S. PATENT DOCUMENTS 5,636,288 A * 6/1997 Bonneville et al. ........... 363/79
6,188,584 B1 * 2/2001 Arai et al. .................. 323/902
6,223,348 B1 * 4/2001 Hayes et al. ................ 348/734
6,259,218 B1 * 7/2001 Kovach et al. ............... 318/16

FOREIGN PATENT DOCUMENTS

| JP | A575548 | 3/1993 |
|---|---|---|
| JP | A2324688 | 11/2000 |

* cited by examiner

Primary Examiner—Shawn Riley (57) ABSTRACT

A remote control receiving device mounted on an apparatus has a switch circuit and an LED. The switch circuit is connected between a power supplied circuit of the apparatus and a power source. The LED functioning as a light receiving element receives an optical signal from a transmitting device. When the apparatus turns into a standby state based on an optical signal from a transmitting device, the switch circuit is brought into OFF by a microcomputer in the remote control receiving device. This intercept supply of power to the remote control light receiving circuit as well as the apparatus. When the LED receives an optical signal from the transmitting device, the LED outputs a electric control signal under an unbias state to turn on the switch circuit. Thereby, power is supplied to the apparatus.

6 Claims, 8 Drawing Sheets

POWER CONTROL DEVICE, REMOTE CONTROL RECEIVING DEVICE AND OPTICAL COMMUNICATION DEVICE WITH ZERO POWER CONSUMPTION DURING STANDBY

BACKGROUND OF THE INVENTION

The present invention relates to a power control device for controlling power supply to household electrical appliances, a remote control receiving device for receiving a remote control optical signal from a remote control device, and an optical communications device for performing optical communications.

Conventionally, there is known a remote control receiving device which is mounted on general household electrical appliances for implementing ON/OFF (operating/standby) control of power supply circuits thereof.

Figure 6:
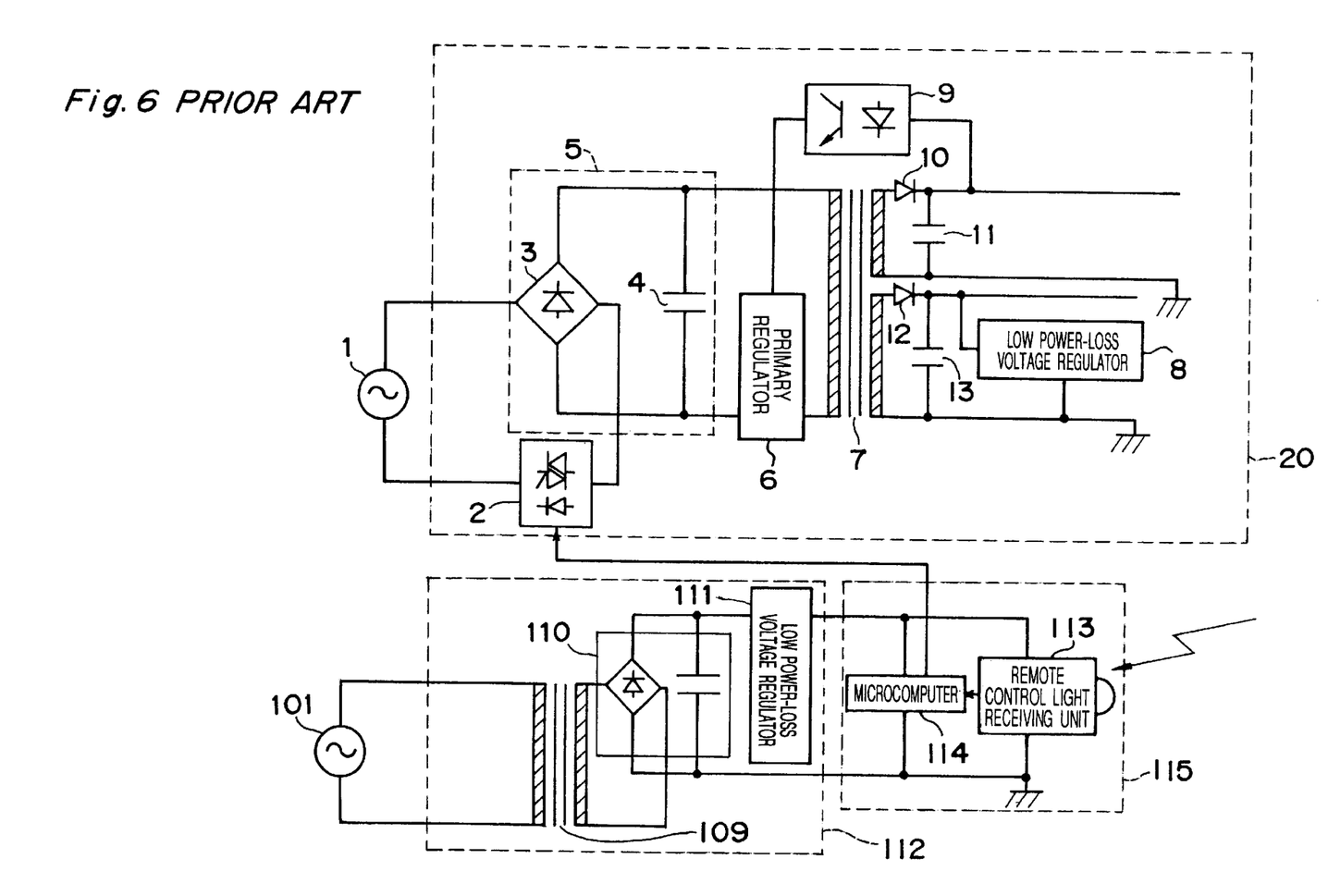
FIG. 6 is a schematic configuration diagram showing main part of a household electrical appliance using a conventional remote control receiving device.

FIG. 6 is a schematic configuration diagram showing main part of an household electrical appliance using the above-stated remote control receiving device. On the primary side of a power supply transformer 7, there are provided a rectifying and smoothing circuit 5 and a primary regulator 6. The rectifying and smoothing circuit 5 composed of a rectifying circuit 3 and a smoothing capacitor 4 and connected to an AC (alternating current) 100V commercial power source 1 via a solid-state relay (SSR) 2. On the secondary side of the power supply transformer 7, there are provided a first rectifying and smoothing circuit composed of a diode 10 and a capacitor 11, and a second rectifying and smoothing circuit composed of a diode 12 and a capacitor 13. An output from the first rectifying and smoothing circuit is connected to an input terminal of a photocoupler 9, and an output terminal of the photocoupler 9 is connected to the primary regulator 6. A low power-loss voltage regulator 8 is used on the output side of the second rectifying and smoothing circuit so as to supply power at a stable power supply voltage. The solid-state relay 2, the rectifying and smoothing circuit 5, the primary regulator 6, the power supply transformer 7, the low power-loss voltage regulator 8, the photocoupler 9, the diode 10, the capacitor 11, the diode 12, and the capacitor 13 constitute a main power circuit 20. Further, a standby power supply transformer 109, a rectifying and smoothing circuit 110, and a low power-loss voltage regulator 111 constitute an auxiliary power supply circuit 112, while a remote control light receiving unit 113 and a microcomputer 114 constitute a remote control light receiving circuit 115.

As shown in FIG. 6, in a household electrical appliance which uses the above-stated remote control receiving device, the auxiliary power supply circuit 112 supplies power to the remote control light receiving circuit 115 during standby. In the standby state, the solid-state relay 2 is in an OFF state, where power supply to the main power circuit 20 is shut off.

When a user attempts to turn on power of an apparatus by remote control, the remote control light receiving unit 113 receives an optical signal transmitted from a remote control transmitting device. Upon receiving an electric signal from the remote control light receiving unit 113, the microcomputer 114 outputs a control signal to the solid-state relay 2 to set the solid-state relay 2 to an ON state. This makes the main power circuit 20 connected to the commercial power source 1 supply power to each part of the circuit and put the household electrical appliance into an operating state.

On the other hand, when a user attempts to stop the household electrical appliance in operation, the remote control light receiving unit 113 also receives an optical signal transmitted from the remote control transmitting device. Upon receiving an electric signal requesting stop of operation detected by the remote control light receiving unit 113, the microcomputer 114 outputs a control signal to the solid-state relay 2 so as to set the solid-state relay 2 to an OFF state. Consequently, a power supply line between the main power circuit 20 and the commercial power source 1 is intercepted, which brings the household electrical appliance into a stopped state i.e. a standby state. In the standby state, the auxiliary power supply circuit 112 supplies power to keep the microcomputer 114 and the remote control light receiving circuit 115 in operation, resulting in continuous consumption of power though small in amount.

There is another remote control receiving device, which is mounted on general household electrical appliances to implement ON/OFF (operating/standby) control of power circuits thereof. In this device, a high-capacity capacitor charged during operation is used as an auxiliary power source during standby.

Figure 7:
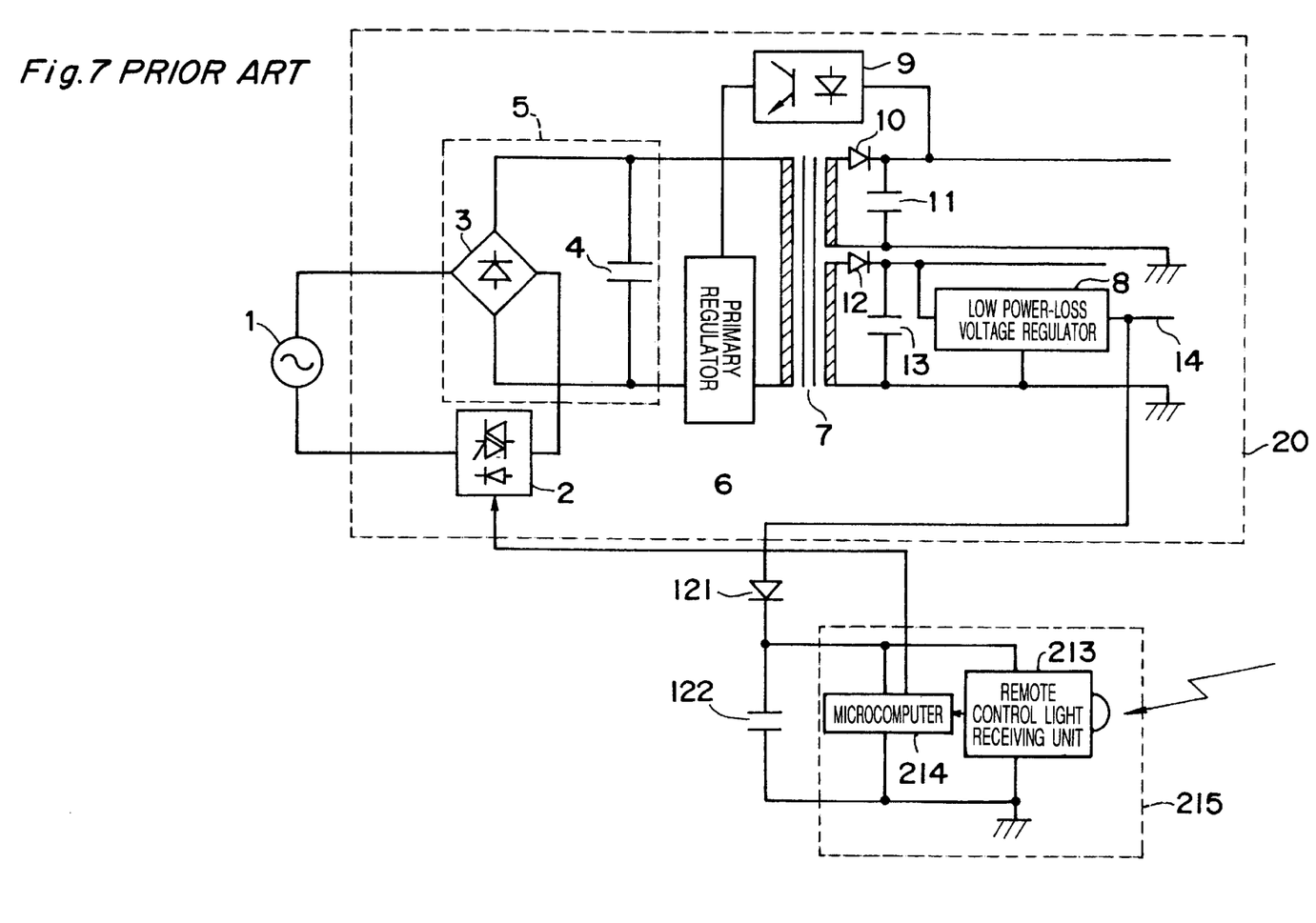
FIG. 7 is a schematic configuration diagram showing main part of a household electrical appliance using another conventional remote control receiving device.

FIG. 7 is a schematic configuration diagram showing main part of an household electrical appliance using the above-stated remote control receiving device. This remote control receiving device uses a high-capacity capacitor 122, for example a high-capacity electrolytic capacitor or a super capacitor, as an auxiliary power source of a remote control light receiving circuit 215 instead of the auxiliary power supply circuit 112 shown in FIG. 6. The high-capacity capacitor 122 is connected to an output of the low power-loss voltage regulator 8 via a diode 121.

The remote control light receiving circuit 215 made up of a microcomputer 214 and a remote control light receiving unit 213 shown in FIG. 7 receives an optical signal transmitted from the remote control transmitting device even during standby like the case of FIG. 6. Therefore, the remote control light receiving circuit 215 requires continuous operation. During operation, the remote control light receiving circuit 215 is supplied with power from a DC power supply line 14 of the main power circuit 20, while the high-capacity capacitor 122 is simultaneously charged via the DC power supply line 14 and the diode 121.

In the above-stated remote control receiving device, when a user attempts to stop operation of the in household electrical appliance by remote control, the remote control light receiving unit 213 receives the instruction as an optical signal from the remote control transmitting device in the same way as that of FIG. 6. The microcomputer 214 determines the contents thereof and outputs a control signal to the solid-state relay 2 to set the solid-state relay 2 to an OFF state. After the solid-state relay 2 is in the OFF state, a voltage of the DC power supply line 14 becomes zero, and so the high-capacity capacitor 122 starts discharging power. Thus, the high-capacity capacitor 122 is used as a power source of the remote control light receiving circuit 215.

When a standby time is longer, the high-capacity capacitor 122 runs short of a charged power. To cope with this problem, the microcomputer 214 monitors a voltage supplied by the high-capacity capacitor 122. When the voltage becomes less than a certain voltage level, the microcomputer 214 outputs a control signal to the solid-state relay 2 to set the solid-state relay 2 to an ON state for recharging the high-capacity capacitor 122. Upon completion of recharge of the high-capacity capacitor 122, the microcomputer 214 outputs a control signal to the solid-state relay 2 to set the solid-state relay 2 again to an OFF state. In this way, ON/OFF operation of the main power circuit 20 is regularly repeated, which causes consumption of power on the same basis.

Figure 8:
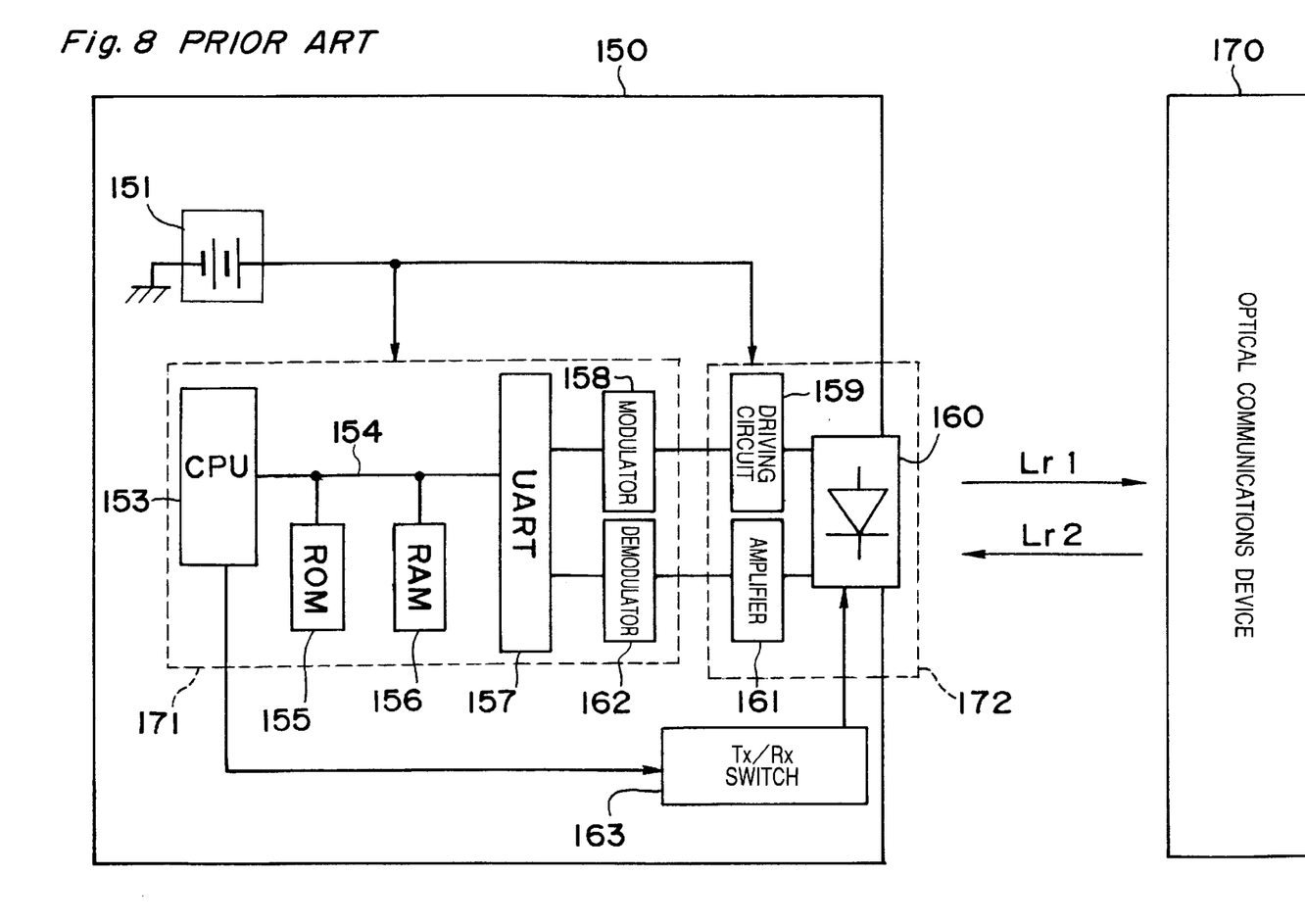
FIG. 8 is a block diagram showing a conventional optical communications device.

As an optical communications device, there is a portable device implementing two-way communications. The optical communications device incorporates a battery 151 and uses it as a power source as shown in FIG. 8. In the optical communications device implementing two-way communications, one LED executes both transmitting and receiving operations.

A CPU (Central Processing Unit) 153 mounted on the optical communications device 150 is connected via a signal bus 154 to a ROM (Read Only Memory) 155 storing programs necessary for operating the CPU 153, a RAM (Random Access Memory) 156 for use in storing transmitted and received data, and a UART (Universal Asynchronous Receiver Transmitter) 157 for conducting Serial/Parallel conversion. An output of the UART 157 is connected in sequence to a modulator 158 for modulating serial data outputted from the UART 157, a driving circuit 159 for driving an LED 160, and the LED 160 for sending an optical signal Lr1. The LED 160 converts an optical signal Lr2 received as a light receiving element to an electric signal. An output of the LED 160 is connected in sequence an amplifier 161 for amplifying the output, and a demodulator 162 for demodulating a signal outputted from the amplifier 161 and converting it to a serial data signal. An output of the demodulator 162 is connected to an input terminal of the UART 157. Function blocks of the CPU 153, the ROM 155, the RAM 156, the UART 157, the modulator 158, and the demodulator 162 are formed on one LSI chip 171.

In the above-configured optical communications device 150, an optical signal Lr1 transmitted from the LED 160 is received by an optical communications device 170 having the same function as the optical communications device 150. On the other hand, an optical signal Lr2 transmitted from the optical communications device 170 is received by the LED 160 of the optical communications device 150. In this way, two-way communications with optical signals are implemented between the optical communications device 150 and the optical communications device 170. It is noted that the LED 160 is used in a transmission (light emission) mode and a reception (light reception) mode, and switching therebetween is made with use of a Tx/Rx switch 163. The switching operation of the Tx/Rx switch 163 is controlled by the CPU 153.

However, the remote control receiving devices shown in FIGS. 6 and 7 need to retain the microcomputers 114 and 214 as well as the remote control light receiving units 113 and 213 in an operating state even when the apparatus is on standby in order to receive and execute a next instruction from a remote control transmitting device and the like. This causes continuous consumption of power during standby.

In addition, as to the optical communications devices 150 and 170 using the battery 151 as a power source shown in FIG. 8, after completing a communication and entering into a standby state, it is impossible to predict when the optical communications devices 150 and 170 receive a next optical signal from a communicating counterpart and restart operation. Accordingly, the optical communications devices 150 and 170 need to be in a reception acceptable state all the time. More particularly, the optical communications devices 150 and 170 need to keep a partial function of the CPU 153 and the entire function of a remote control light receiving unit 172 running even during standby, which causes continuous consumption of the battery 151.

In the case of household electrical appliances in particular, a period of time in a standby state is longer than a period of time actually in use. Therefore, decrease of power consumption during standby is an object common to all household electrical appliances.

SUMMARY OF THE INVENTION

It is an object of the present invention to provide a power control device, a remote control receiving device, and an optical communications device, which can make virtually zero power consumption during standby and remarkably improves life time of a battery.

In order to accomplish the above-stated object, a first aspect of the present invention provides a power control device to be mounted on an apparatus, comprising: a switch circuit connected between a power supplied circuit of the apparatus and a power source and brought into an OFF state when the apparatus turns into a standby state; and an LED outputting an electric signal in an unbias condition to bring the switch circuit into an ON state when the LED detects an optical signal.

According to the above configured power control device, the switch circuit connected between the power source and the power supplied circuit is brought into an OFF state when the apparatus turns to a standby state. On standby, if the LED in an unbias condition receives an optical signal, that is, a ray of light having a wavelength within a sensitivity range of the LED from the outside, the LED generates electromotive force, and outputs an electric signal to bring the switch circuit into the ON state. When the switch circuit is in the ON state, power is supplied to the power supplied circuit, and the apparatus is brought into an operating state. Since the switch circuit electrically intercepts the power supplied circuit when the apparatus is on standby, power consumption thereof can be virtually zero during standby. When a battery is used for a power source of the portable apparatus in particular, the switch circuit, which intercepts the power supplied circuit from the battery during standby, results in remarkable improvement of battery consumption.

In one embodiment of the first aspect of the present invention, the power control device further comprises retaining means for retaining the switch circuit in the ON state after the electric signal from the LED brings the switch circuit into the ON state.

According to the power control device in the above embodiment, once the electric signal from the LED brings the switch circuit into the ON state, the ON state thereof can be retained even if the LED does not receive an optical signal thereafter.

A second aspect of the present invention provides a remote control receiving device mounted on an apparatus, comprising: a switch circuit connected between a power supplied circuit of the apparatus and a power source and brought into an OFF state when the apparatus turns into a standby state; and an LED as a light receiving element that receives an optical signal for remote control from a transmitting device, and outputs an electric signal in an unbias condition to bring the switch circuit into an ON state when the LED detects the optical signal.

According to the above-configured remote control receiving device, in addition to the effects described in the first aspect of the present invention, the LED used for driving the switch circuit makes it possible to simplify the circuit configuration and decrease a cost.

A third aspect of the present invention provides an optical communications device, comprising: a switch circuit connected between a power supplied circuit of the optical communications device and a power source and brought into an OFF state when the optical communications device turns to a standby state; and an LED as a light receiving element that receives an optical signal from a transmitting device, and outputs an electric signal in an unbias condition to bring the switch circuit into an ON state when the LED detects the optical signal.

According to the above-configured optical communications device, in addition to the effects described in the first aspect of the present invention, the optical communications device can implement both two-way optical communications and one-way optical communications. In the case of the one-way optical communications, the present invention is applied to a receiving side of the optical communications device.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of a power control device, a remote control receiving device, and an optical communications device of the present will be described hereinafter in detail with reference to the accompanying drawings.

Figure 1:
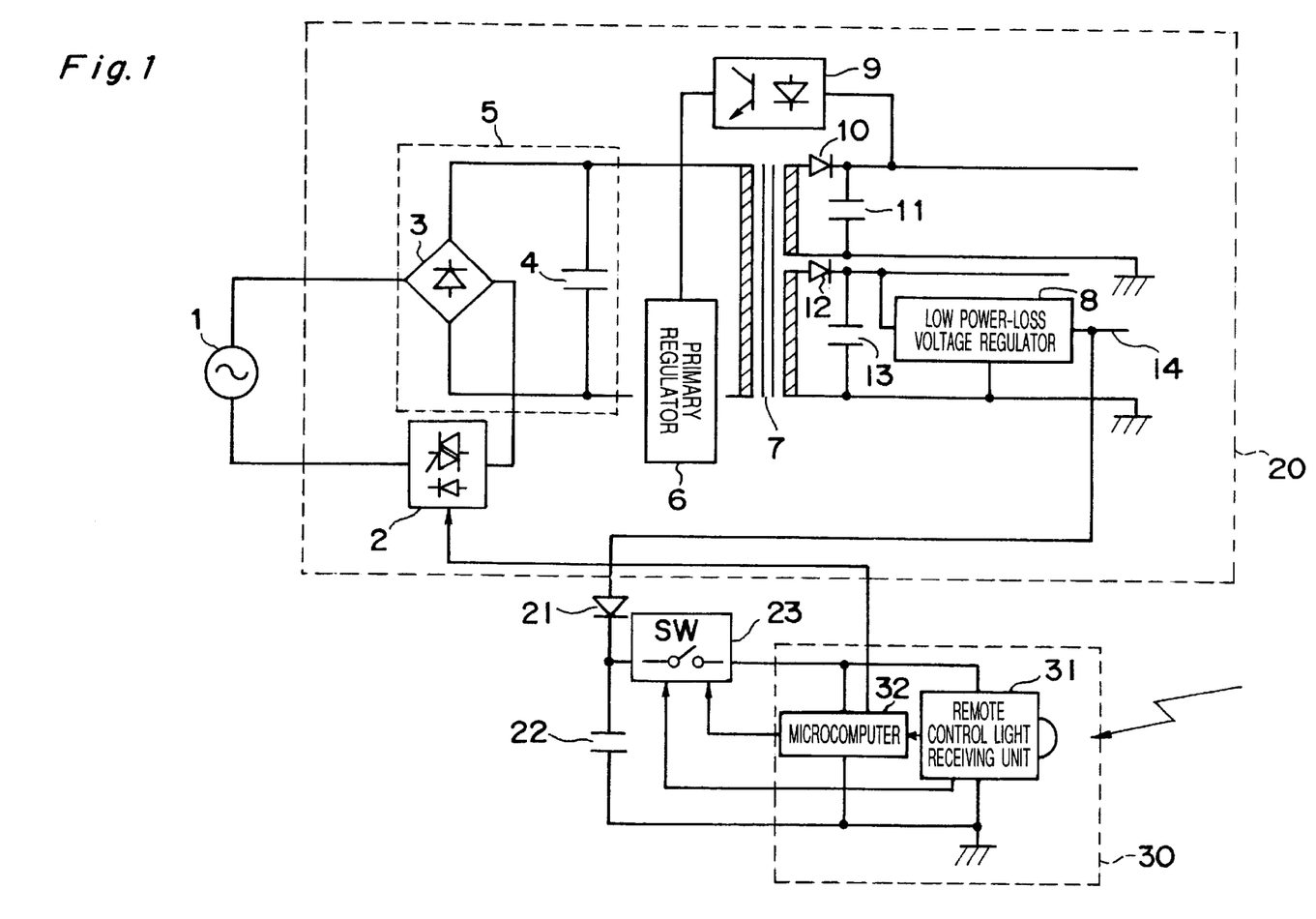
FIG. 1 is a schematic configuration view showing main part of a household electrical appliance using a remote control receiving device according to a first embodiment of the present invention.

FIG. 1 is a schematic configuration view showing main part of a household electrical appliance using a remote control receiving device according to a first embodiment of the present invention.

As shown in FIG. 1, the household electrical appliance using the remote control receiving device is made up of a solid-state relay (SSR) 2, one terminal of which is connected to one terminal of a commercial power source 1; a rectifying circuit (diode bridge) 3, one input terminal of which is connected to the other terminal of the solid-state relay 2, and the other input terminal of which is connected to the other terminal of the commercial power source 1; a smoothing capacitor 4, both terminals of which are respectively connected to both positive and negative output terminals of the rectifying circuit 3; a primary regulator 6, one terminal of which is connected to a negative-side output terminal of the rectifying circuit 3; and a power supply transformer 7, one terminal of a primary-side coil of which is connected to a positive-side output terminal of the rectifying circuit 3, and the other side of the primary-side coil of which is connected to the other terminal of the primary regulator 6. The rectifying circuit 3 and the smoothing capacitor 4 constitute a rectifying and smoothing circuit 5. The commercial power source 1 is AC 100V in Japan.

The household electrical appliance using the remote control receiving device is also made up of a diode 10, anode of which is connected to one side of a first coil on the secondary side of the power supply transformer 7; a capacitor 11, one terminal of which is connected to a cathode of the diode 10, and the other terminal of which is connected to the other side of the first coil; a diode 12, anode of which is connected to one side of a second coil on the secondary side of the power supply transformer 7; a capacitor 13, one terminal of which is connected to a cathode of the diode 12, and the other terminal of which is connected to the other side of the second coil; a low power-loss voltage regulator 8, an input terminal of which is connected to a cathode of the diode 12, and a ground terminal of which is connected to the other side of the second coil; and a photocoupler 9, an input terminal of which is connected to a cathode of the diode 10, and an output terminal of which is connected to a control input terminal of the primary regulator 6. The diode 10 and the capacitor 11 constitute a first rectifying and smoothing circuit, while the diode 12 and the capacitor 13 constitute a second rectifying and smoothing circuit. In addition, one terminal of a DC power supply line 14 is connected to an output terminal of the low power-loss voltage regulator 8.

On the secondary side of the power supply transformer 7, only necessary numbers of power supply lines (two in FIG. 1) are outputted depending on DC power supply voltage necessary in each circuit (unshown) on a-load side. In addition, the low power-loss voltage regulator 8 is used in the output on the secondary side of the power supply transformer 7 in order to achieve a stable power supply voltage regardless of a load change.

The solid-state relay 2, the rectifying and smoothing circuit 5, the primary regulator 6, the power supply transformer 7, the low power-loss voltage regulator 8, the photocoupler 9, the diode 10, the capacitor 11, the diode 12, and the capacitor 13 constitute a main power circuit 20.

Further, an anode of a diode 21 is connected to the other side of the DC power supply line 14, and a high-capacity capacitor 22 is connected to between a cathode of the diode 21 and a ground. One terminal of a switch circuit 23 is connected to the cathode of the diode 21. The other terminal of the switch circuit 23 is connected to power input terminals of both a microcomputer 32 serving as a retaining means and a remote control light receiving unit 31. Ground terminals of the microcomputer 32 and the remote control light receiving unit 31 are each connected to the ground. Thus, the microcomputer 32 and the remote control light receiving unit 31 are supplied with power from the DC power supply line 14 on the secondary side of the power supply transformer 7 via the diode 21 and the switch circuit 23. The microcomputer 32 and the remote control light receiving unit 31 constitute a remote control light receiving circuit 30 as a power supplied circuit, whereas the switch circuit 23, the microcomputer 32, and the remote control light receiving unit 31 constitute a remote control receiving device.

During operation of the apparatus, the switch circuit 23 retains ON state with a control signal from the microcomputer 32, and the remote control light receiving circuit 30 is supplied with power from the DC power supply line 14 via the diode 21, while the high-capacity capacitor 22 is charged.

When a user stops the apparatus by remote control, the remote control light receiving unit 31 receives an instruction as an optical signal from a remote control transmitting device (unshown), and the microcomputer 32 determines the contents of the received instruction and outputs a control signal to the solid-state relay 2 to set the solid-state relay 2 to an OFF state. Then, the microcomputer 32 ends operation by itself. This terminates a control signal to the switch circuit 23, and brings the switch circuit 23 into an OFF state. As a result, power supply to all the circuits of the apparatus including remote control light receiving circuit 30 is shut off, and the apparatus enters into a standby state. In the standby state, power consumption is virtually zero since power supply to each circuit is intercepted.

Figure 2:
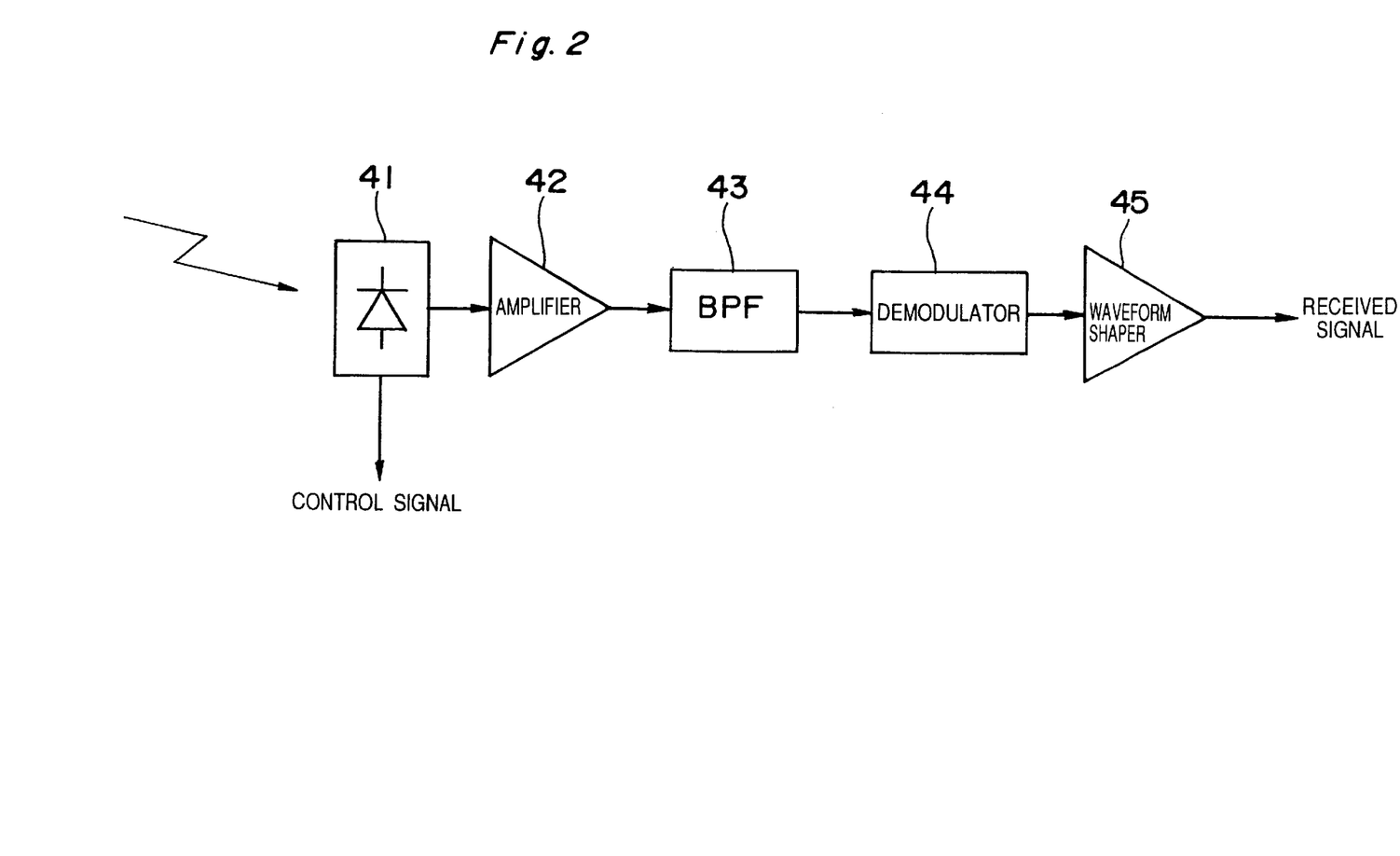
FIG. 2 is an inner block diagram showing a remote control light receiving unit in the remote control receiving device shown in FIG. 1.

FIG. 2 is an inner circuit block diagram of the remote control light receiving unit 31 shown in FIG. 1. As shown in FIG. 2, the remote control light receiving unit 31 incorporates an LED 41 as a light receiving element having sensitivity to a wavelength range of an optical signal transmitted from a remote control transmitting device (unshown). The LED 41 receives an optical signal transmitted from the remote control transmitting device, and converts it to an electric signal. Thus-converted electric signal is amplified in an amplifier 42 connected immediately after the LED 41, and then subjected to bandwidth limiting in a band pass filter (BPF) 43 followed by the amplifier 42. The electric signal is then demodulated in a demodulator 44, and subjected to waveform shaping in a waveform shaper 45, after which the signal is sent to the microcomputer 32 (shown in FIG. 1).

Upon restoring an operation of the apparatus stayed in an standby state, the LED 41 converts an optical signal to an electric signal and outputs the electric signal as a control signal necessary for operating the switch circuit 23 (shown in FIG. 1). Even in an unbias condition, the LED 41 generates electromotive force upon receiving a ray of light having a wavelength within a sensitivity range of the LED41. The electromotive force is used as a control signal to turn on the switch circuit 23.

Hereinbelow, description will be given of the operation when an household electrical appliance using the above-configured remote control receiving device restarts operation in an standby state.

When a user depresses an operation start button (power ON/OFF button) on a remote control transmitting device (unshown) to operate an household electrical appliance with the remote control transmitting device, an isoptical signal is transmitted from the remote control transmitting device to a remote control light receiving unit 31 in the main body of the household electrical appliance shown in FIG. 1.

The optical signal transmitted from the unshown remote control transmitting device is received by an LED 41 (shown in FIG. 2) incorporated in the remote control light receiving unit 31. In the LED 41, an electric signal is generated by the received optical signal, and sent to a switch circuit 23 as a control signal.

Consequently, the switch circuit 23 is turned on, and a high-capacity capacitor 22 starts power discharge, which means that power is supplied to a remote control light receiving circuit 30. As a result, a microcomputer 32 starts operation, and as the first instruction thereof, the microcomputer 32 outputs a control signal to a solid-state relay 2 to set the solid-state relay 2 to an ON state. When the solid-state relay 2 is brought into an ON state, power is supplied from a main power circuit 20 to the entire apparatus, which restores the entire apparatus to an operating state.

Figure 5:
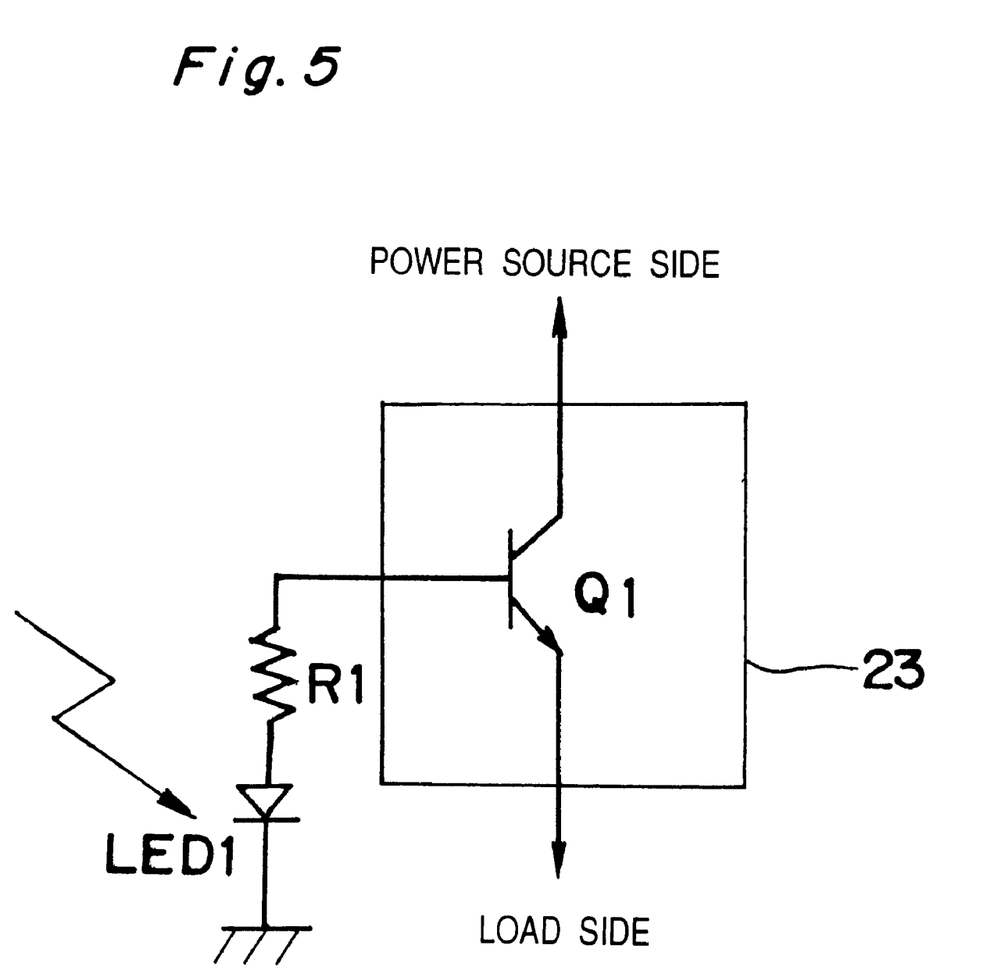
FIG. 5 is a circuit diagram showing a power control device according to the present invention.

As shown in FIG. 5, the switch circuit 23 is composed of an NPN transistor Q1, whose collector is connected to a power source side (high-capacity capacitor 22) and whose emitter is connected to a load side (power terminal of the remote control light receiving circuit 30). One terminal of a resistor R1 is connected to a base of the NPN transistor Q1, and the other terminal of the resistor R1 is connected to an anode of a diode LED 1 (equivalent to the LED 41). A cathode of the diode LED 1 is connected to the ground. The diode LED 1, the resistor R1 and the NPN transistor Q1 constitute a power control device.

A signal from the microcomputer 32, though not shown in FIG. 2, is inputted to the base of the transistor Q1 in the switch circuit 23. Accordingly, after the diode LED 1 brings the transistor Q1 of the switch circuit 23 into an ON state to supply power from the main power circuit 20 to the remote control light receiving circuit 30 including the microcomputer 32 shown in FIG. 1, the microcomputer 32 as a retaining means controls the switch circuit 23 so that the ON state is retained.

Thus, the switch circuit 23 intercepts the remote control light receiving circuit 30 from the high-capacity capacitor 22, which makes virtually zero power consumption of the apparatus during standby. In addition, an LED of the remote control light receiving unit 31, which is composed of a light receiving element for receiving an optical signal for remote control from a sending side, is used for driving the switch circuit 23, and therefore enables simplification of a circuit configuration and decrease of a cost.

Further, the microcomputer 32 as a retaining means retains the switch circuit 23 in an ON state. Consequently, once an electric signal from the remote control light receiving unit 31 sets the switch circuit 23 to an ON state, the ON state thereof can be retained even if the remote control light receiving unit 31 does not receive an optical signal thereafter.

Although the household electrical appliance using the remote control receiving device has been described above in the first embodiment, the remote control receiving device of the present invention is applicable not only to the household electrical appliances, but also to any other electronic apparatus having a standby state.

Figure 3:
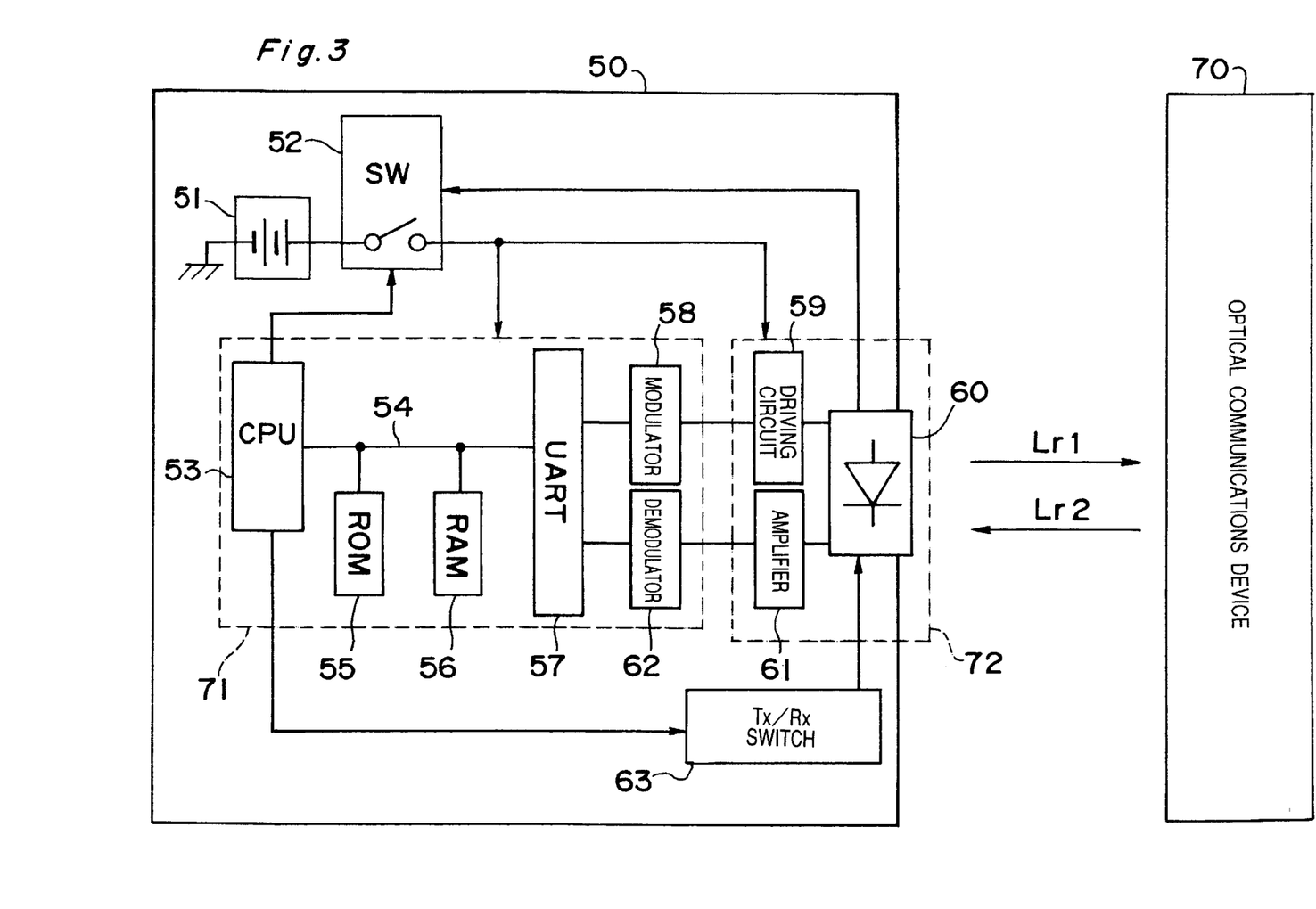
FIG. 3 is a block diagram showing an optical communications device according to a second embodiment of the present invention.

FIG. 3 is a schematic configuration diagram showing an optical communications device according to a second embodiment of the present invention. As shown in FIG. 3, the optical communications device uses a common LED as a receiving and transmitting element of optical signals. In other words, the LED is used as both a light emitting element and a light receiving element.

The following description discusses operation of the optical communications device when it restarts operation from a standby state.

An optical signal Lr1 transmitted from an LED 60 of the optical communications device 50 is received by another optical communications device 70 having the same function as the optical communications device 50, whereas an optical signal Lr2 transmitted from the optical communications device 70 is received by the LED 60 of the optical communications device 50. In this way, two-way communications with optical signals are implemented between the optical communications device 50 and the optical communications device 70.

The LED 60 of the optical communications device 50 converts an electric signal from a driving circuit 59 to an optical signal (light emission) upon sending the optical signal, and converts an optical signal Lr2 from the optical communications device 70 to an electric signal upon receiving the optical signal. At this point, a Tx/Rx switch 63 is operated by a high level control signal or a low level control signal outputted from a CPU 53 so that the LED 60 is switched between a light emission mode and a light reception mode. More particularly, the LED 60 is in the light emission mode when transmitting an optical signal, whereas the LED 60 is in the light reception mode when receiving an optical signal. Therefore, transmitting operation and receiving operation are not conducted at the same time. Consequently, one LED 60 (for obtaining a wider beam spread angel or stronger optical intensity, a plurality of LEDs may be used as one pair) implements half-duplex two-way communications.

In the case of data transmission, data stored in a RAM 56 is transferred to a UART 57 by control of a CPU 53 based on a program in a ROM 55. The data is converted from parallel data to serial data in the UART 57, and then transferred to a modulator 58. A signal modulated in the modulator 58 then passes through the driving circuit 59, and the signal is transmitted from the LED 60 as an optical signal Lr1. At this point, the LED 60 is set to be in the light emission mode by the Tx/Rx switch 63 controlled by a control signal from the CPU 53.

On the other hand, in the case of data reception, an optical signal Lr2 transmitted from the optical communications device 70 is received in the LED 60 of an optical communications device 50 and converted to an electric signal. The signal converted to an electric signal is amplified in a modulator 61, and then transferred to a demodulator 62, where the signal is demodulated to serial data. Then, the data is further transferred to the UART 57, where it is converted to parallel data. The data is stored in the RAM 56 by control of the CPU 53 based on a program in the ROM 55. At this point, the LED 60 is set to be in the reception mode by the Tx/Rx switch 63 that is controlled by a control signal from the CPU 53.

Function blocks of the CPU 53, the ROM 55, the RAM 56, the UART 57, the modulator 58, and the demodulator 62 are formed on one LSI chip 71 as a power supplied circuit. Further, the driving circuit 59, the LED 60, and the amplifier 61 constitute an optical transmitting and receiving unit 72 serving also as a power supplied circuit.

When communications between the optical communications device 50 and the optical communications device 70 are intermitted for a certain period of time, the optical communications device 50 and the optical communications device 70 enter into a standby state under control of the CPU 53. When the CPU 53 ends its operation, a control signal to a switch circuit 52 is simultaneously stopped, which brings the switch circuit 52 into an OFF state. As a result, a battery 51 of the optical communications device 50 is isolated from each circuit, which makes virtually zero battery consumption.

When the optical communications device 50 in a standby state restarts operation upon receiving a call from another optical communications device 70, the LED 60 in an unbias condition receives an optical signal from the optical communications device 70, and converts the signal to an electric signal. The converted electric signal is sent to the switch circuit 52 as a control signal to bring the switch circuit 52 into an ON state. Upon reception of the control signal from the LED 60, the switch circuit 52 is brought into an ON state so that power is supplied from the battery 51 to each circuit.

This restarts operation of the CPU 53, and as a first operation thereof, the CPU 53 outputs a control signal to the switch circuit 52 to keep the ON state thereof.

As described above, the switch circuit 52 intercepts the battery 51 from each circuit. Therefore, the switch circuit 52 makes virtually zero power consumption during standby and thus remarkably improves battery consumption. In addition, the LED 60, which is composed of a light receiving element that receives an optical signal from a sending side, is used for driving the switch circuit 52. Therefore, the LED 60 makes it possible to simplify the circuit configuration and decrease a cost.

Furthermore, the CPU 53 as a retaining means retains the switch circuit 52 in an ON state. Consequently, once an electric signal from the LED 60 sets the switch circuit 52 to an ON state, the ON state thereof can be retained even if the LED 60 does not receive an optical signal thereafter.

Figure 4:
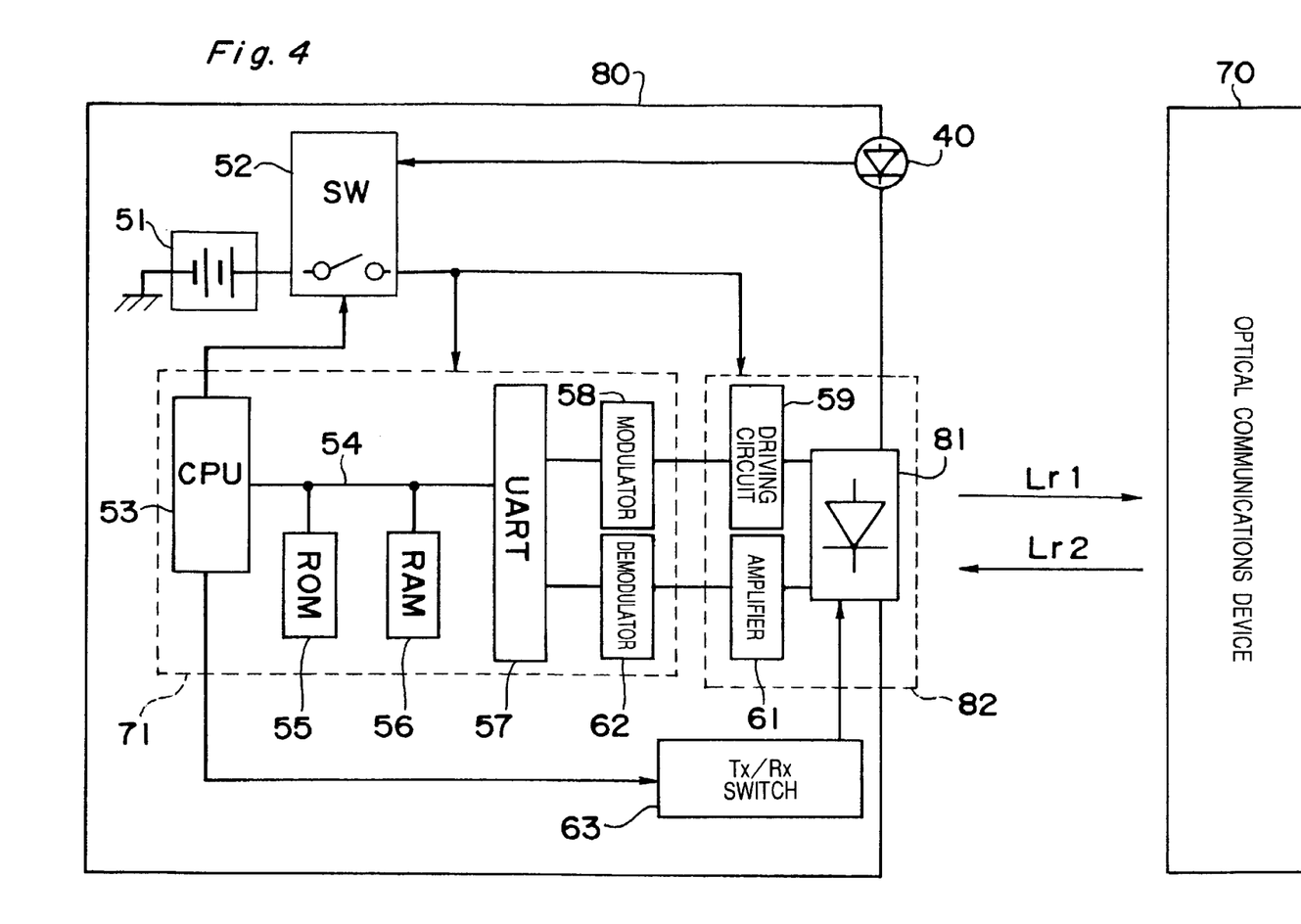
FIG. 4 is a block diagram showing an optical communications device according to a third embodiment of the present invention.

FIG. 4 is a schematic configuration diagram showing an optical communications device according to a third embodiment of the present invention. As shown in FIG. 4, the optical communications device incorporates an LED 40 dedicated for light reception only for the purpose of turning on the power of the optical communications device in a standby state. Except this LED 40 dedicated for light reception, the optical communications device has the same configuration as the optical communications device in the second embodiment. It is noted, therefore, that like component members are designated by like reference numerals, and description thereof will be omitted. Function blocks of the CPU 53, the ROM 55, the RAM 56, the UART 57, the modulator 58 and the demodulator 62 are formed on one LSI chip 71 as a power supplied circuit. Further, the driving circuit 59, an LED 81 and the amplifier 61 constitute an optical transmitting and receiving unit 82.

When the optical communications device 80 in a standby state restarts operation by remote control, as shown in FIG. 4, the LED 40 in an unbias condition receives an optical signal from a sender of the optical communications device 70, and converts the optical signal to an electric signal. The converted electric signal is sent to the switch circuit 52 as a control signal to bring the switch circuit 52 into an ON state. Upon reception of the control signal from the LED 40, the switch circuit 52 is brought into an ON state, and power is supplied from the battery 51 to each circuit. This restarts operation of the CPU 53 as a retaining means, and as a first operation thereof, the CPU 53 outputs a control signal to the switch circuit 52 to keep the ON state thereof.

As described above, the switch circuit 52 intercepts the battery 51 from each circuit, which makes virtually zero power consumption during standby and thus remarkably improves battery consumption. In addition, a power control device is composed of the LED 40 and the switch circuit 52, which makes it possible to simplify the circuit configuration and decrease a cost.

Furthermore, the CPU 53 as a retaining means retains the switch circuit 52 in an ON state. Consequently, once an electric signal from the LED 40 sets the switch circuit 52 to an ON state, the ON state thereof can be retained even if the LED 40 does not receive an optical signal thereafter.

The power control device of the present invention may be applied to any another electronic apparatus as well as remote control receiving devices or optical communications devices.

The power control device of the present invention may be applied to a receiving side of optical communications devices implementing one-way optical communications although the optical communications device implementing two-way optical communications has been described above in the first and the second embodiments.

Further, in the first to the third embodiments, the microcomputer 32 and the CPU 53 are used as a retaining means. However, the retaining means is not limited thereto, and may be composed of other circuits which can retain the switch circuit in an ON state.

As is clear from the above description, according to the power control device, the remote control receiving device and the optical communications device of the present invention, a switch circuit is provided on a power supply line between a power supplied circuit and a power source, and the switch circuit is set to be an OFF state during standby so as to shut off power supply from the power source to each circuit, by which power consumption during standby can be made close to zero. This makes a battery life of a portable device longer. The above-stated switch circuit can be implemented with a simple configuration with use of a transistor. In addition, no drastic circuit change is necessary since the switch circuit is activated by using electromotive force of an LED for remote control optical reception or for optical communications. Further, the LED is available at a low cost, so that addition of a new LED for activation of the switch circuit does not have large impact on a total cost. Therefore, this enables easy fabrication of the power control device, the remote control receiving device, and the optical communications device.

The invention being thus described, it will be obvious that the invention may be varied in many ways. Such variations are not be regarded as a departure from the spirit and scope of the invention, and all such modifications as would be obvious to one skilled in the art are intended to be included within the scope of the following claims.

What is claimed is:

1. A power control device to be mounted on an apparatus, comprising:
   a switch circuit connected between a power supplied circuit of the apparatus and a power source and brought into an OFF state when the apparatus turns into a standby state, the switch circuit is capable of shutting off all power to the circuits during the standby state; and
   an LED outputting an electric signal by electromotive force in an unbias condition to bring the switch circuit into an ON state when the LED detects an optical signal.

2. The power control device as defined in claim 1, further comprising:
   retaining means for retaining the switch circuit in the ON state after the electric signal from the LED brings the switch circuit into the ON state.

3. A remote control receiving device mounted on an apparatus, comprising:
   a switch circuit connected between a power supplied circuit of the apparatus and a power source and brought into an OFF state when the apparatus turns into a standby state, the switch circuit is capable of shutting off all power to the circuits during the standby state; and
   an LED as a light receiving element that receives an optical signal for remote control from a transmitting device, and outputs an electric signal by electromotive force in an unbias condition to bring the switch circuit into an ON state when the LED detects the optical signal.

4. The remote control receiving device as defined in claim 3, further comprising:
   retaining means for retaining the switch circuit in the ON state after the electric signal from the LED brings the switch circuit into an ON state.

5. An optical communication device, comprising:
   a switch circuit connected between a power supplied circuit of the optical communications device and a power source and brought into an OFF state when the optical communications device turns to a standby state, the switch circuit is capable of shutting off all power to the circuits during the standby state; and
   an LED as a light receiving element that receives an optical signal from a transmitting device, and outputs an electric signal by electromotive force in an unbias condition to bring the switch circuit into an ON state when the LED detects the optical signal.

6. The optical communications device as defined in claim 5, further comprising:
   retaining means for retaining the switch circuit in the ON state after the electric signal from the LED brings the switch circuit into the ON state.

* * * * *